Nov. 26, 1968     C. J. HUNT     3,412,667
FILM DEVELOPING APPARATUS
Filed Oct. 20, 1965     3 Sheets-Sheet 2
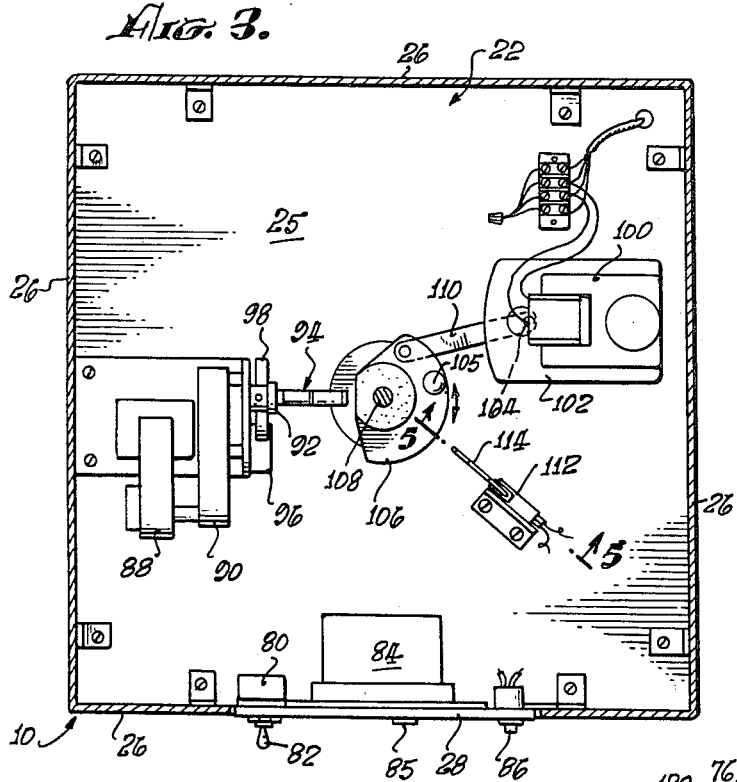
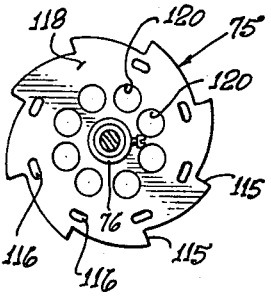
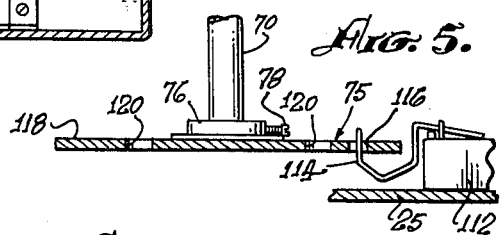
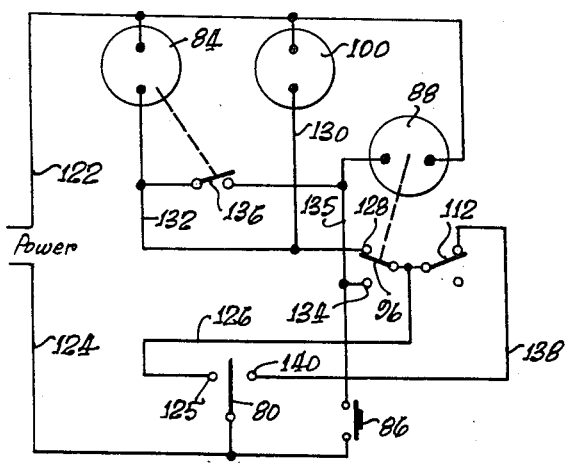
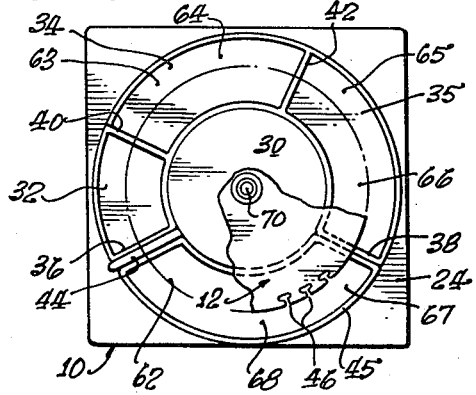
INVENTOR.
CHARLES J. HUNT,
By Jess M Roberts
ATTORNEY.

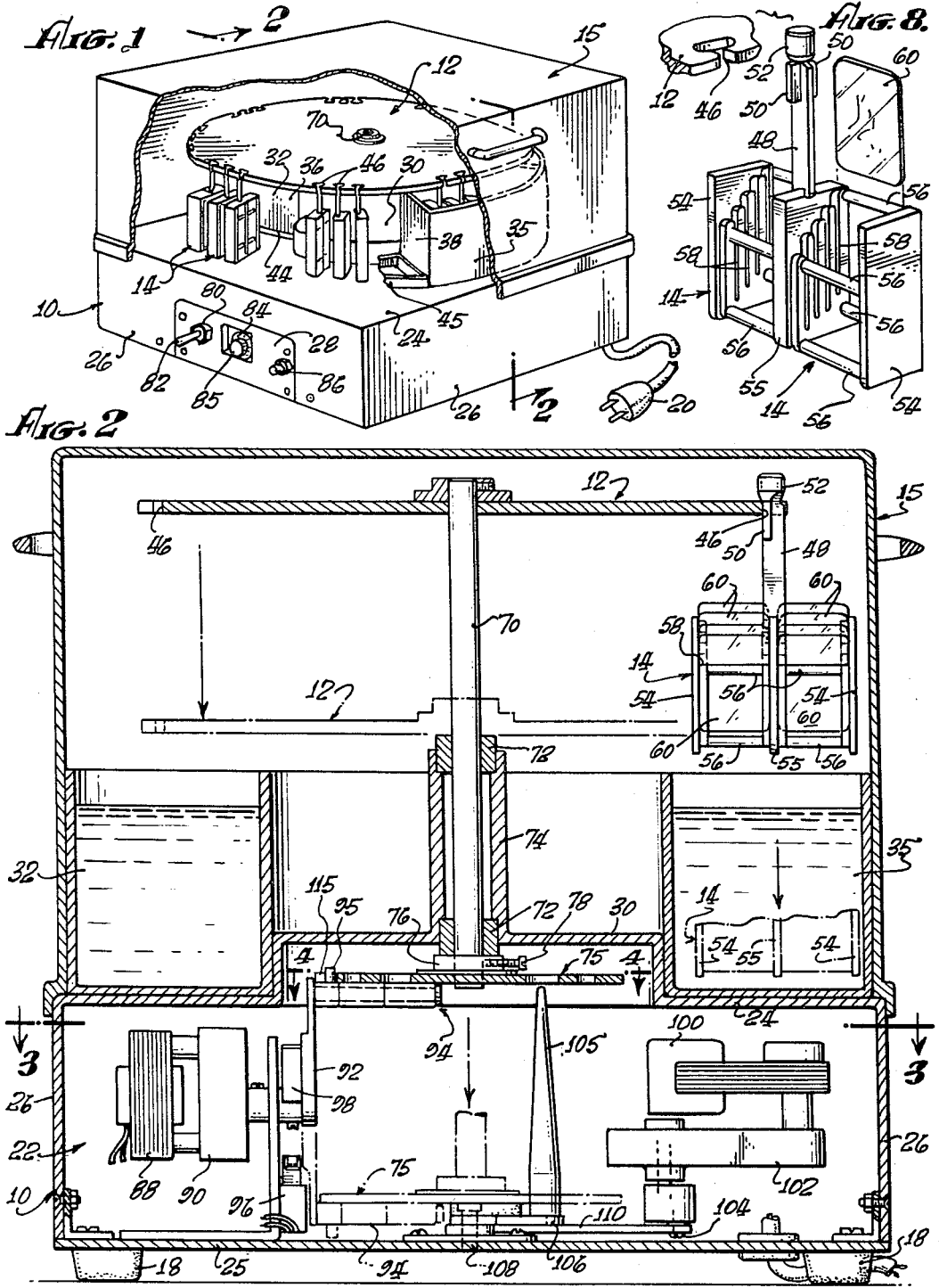

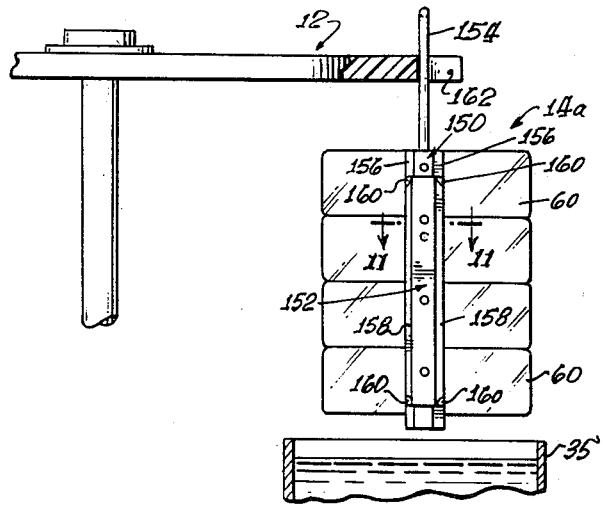
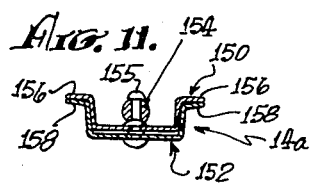
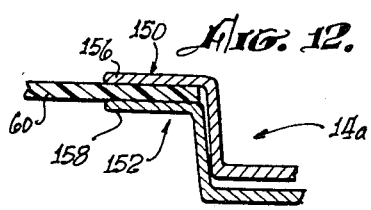
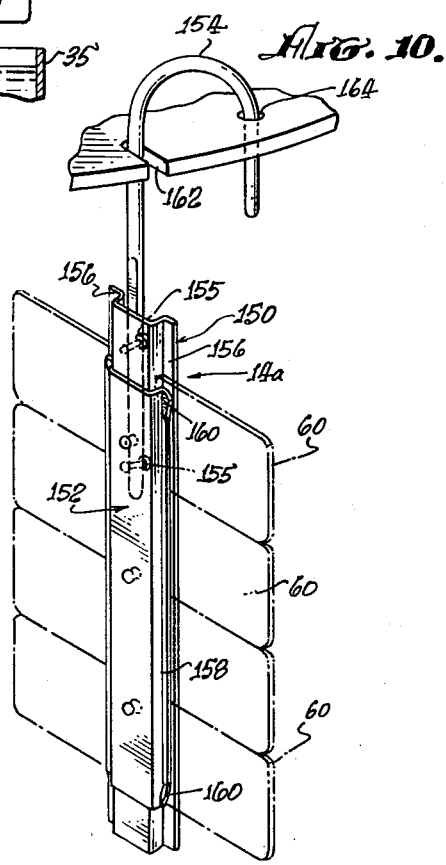

United States Patent Office 3,412,667
Patented Nov. 26, 1968

3,412,667
FILM DEVELOPING APPARATUS
Charles J. Hunt, 6655 Palomino Circle,
Yorba Linda, Calif. 92686
Filed Oct. 20, 1965, Ser. No. 498,244
9 Claims. (Cl. 95—93)

ABSTRACT OF THE DISCLOSURE

A photographic processor having a series of processing tanks containing the various processing solutions arranged in a circular manner, and a film tranferring device for sequentially transferring the film being processed from one processing tank to another. The film transfer device consists of a rotatable turntable and a vertically slidable device shaft. The film is placed in a film holder and then mounted on the periphery of the turntable to be processed. A motor driven crank periodically lifts and rotates the drive shaft to cause the film holders to dip into the successive solutions.

---

This invention relates to an appartus for immersing articles in successive baths and, more particularly, pertains to such an apparatus for automatically carrying out a cycle of successive immersions. While the invention is applicable to various fields, it has been initially applied to the automatic development of dental X-ray film. This initial embodiment of the invention has been selected for the present disclosure by way of illustration and will provide adequate guidance for those skilled in the art who may have occasion to apply these same principles to other specific purposes.

A full set of dental X-rays may comprise fourteen small films which, after exposure must first be processed in a developer bath, then processed in a fixer bath and, finally, rinsed or washed. Even with various expedients to save time and effort, the processing of films is tedious and time consuming and is burdensome for a dental nurse who is kept busy with many other responsibilities. Too often the processing of a set of X-ray films is interrupted to result in faulty processing or even loss of the images.

The broad object of the present invention is to provide a compact, relatively simple and efficient power-actuated apparatus for automatically carrying out the whole cycle of developing, fixing and rinsing the film with predetermined selected timing of the successive steps.

Generally described, this object is attained by providing a plurality of receptacles containing baths arranged sequentially along an arcuate path concentric to an upright axis and by providing a carrier to overhang the arcuate path and to rotate about the upright axis with the films depending therefrom. The rotating carrier is intermittently lifted briefly to lift the films over the walls of the containers. In the preferred practice of the invention the rotary carrier is additionally oscillated when the films are immersed in a bath, the oscillation of the carrier resulting in agitation of the immersed film.

Compactness as well as economy of structure is accomplished by mounting the bath-containing receptacles on the top wall of a control chamber with a carrier in the form of an axially movable turntable overhanging the receptacles. The turntable has a unitary hub structure that extends downward into the control chamber and, as will be described, suitable power means in the control chamber actuates the hub structure to periodically lift and rotate the turntable as well as to oscillate the turntable.

In one mode of operation that may be employed the carrier or turntable performs one cycle to process a batch of the films and then stops automatically, no attention to the apparatus being required during the cycle. In an alternate mode of operation available by manipulation of a selector switch, the apparatus operates continuously step by step and at each step developed film is manually removed and undeveloped film is manually added at a loading station.

The features and advantages of the invention may be understood from the following detailed description and the accompanying drawings.

In the drawings, which are to be regarded as merely illustrative:

FIG. 1 is a perspective view of the presently preferred emodiment of the invention with a portion of the cover broken away to reveal the turntable;

FIG. 2 is a vertical sectional view taken as indicated by the line 2—2 of FIG. 1;

FIG. 3 is a plan view of the components in the control chamber as seen along the sectional line 3—3 of FIG 2;

FIG. 4 is a plan view of the hub structure as seen along the sectional line 4—4 of FIG. 2, the view showing how a control disc of the hub structure is constructed for the step by step operation of the turntable;

FIG. 5 is a fragmentary sectional view along the line 5—5 of FIG. 3 showing how a normally closed switch is related to the control disc for limiting the operation of the apparatus to a single cycle;

FIG. 6 is a top plan view of the apparatus with the cover removed and with the major portion of the turntable broken away to reveal the concealed parts;

FIG. 7 is a wiring diagram of the control system of the apparatus;

FIG. 8 is a perspective view showing the construction of a rack to carry the films and showing a cooperating portion of the turntable;

FIG. 9 is a fragmentary elevational view showing a second embodiment of a rack;

FIG. 10 is a perspective view of the same rack;

FIG. 11 is a section along the line 11—11 of FIG. 9; and

FIG. 12 is an enlarged fragmentary sectional view similar to FIG. 11 showing how a film is engaged by the rack.

As shown in FIG. 1, the apparatus has a rectangular base, generally designated 10, above which a carrier or turntable 12 in the form of a flat disc rotates to carry depending racks 14 of films in a circular path in a cycle in which the racks are immersed in a sequential series of baths. A suitable rectangular cover 15 may be mounted on a base 10 in a light-proof manner to enclose the turntable 12 and the film carried thereby. The base 10 may be provided with elastomeric support members 18 at its four corners for positioning of the apparatus on a table or a laboratory bench and the base is provided with a suitable plug 20 on an electric cord for plugging the electrical control system into a suitable source of electricity for actuating the moving parts.

As shown in FIGS. 2 and 3, the rectangular base 10 is of hollow construction forming what may be termed a control chamber, generally designated 22, having a top wall 24, a bottom wall 25 and four upright walls 26 one of which is a front wall that carries a control panel 28, as shown in FIG. 1. The top wall 24 of the control chamber is formed with a central circular step 30 around which is arranged an arcuate series of three receptacles. As shown in FIG. 6, the three receptacles comprise a receptacle, generally designated 32, to contain a liquid bath in the form of a developing solution, a receptacle, generally designated 34, to contain a liquid bath in the form of a fixing solution and a receptacle, generally designated 35, to contain a liquid bath in the form of a water or some suitable solution for rinsing or washing the developed films.

In the construction shown the three receptacles 32, 34, and 35 are united in a single structure having two radial end walls 36 and 38 and two intermediate radial walls or partitions 40 and 42. In the construction shown the end wall 36 abuts a radial positioning rib 44 for correct positioning of the receptacle structure on the top wall 24. It will be noted that there is an arcuate gap between the two end walls 36 and 38 which is occupied by a shallow arcuate drip tray 45, the drip tray abutting the radial positioning rib 44.

The turntable 12 is formed with a circumferential series of peripheral notches 46 which, as best shown in FIG. 8 are T-shaped in plan with relatively narrow entrances, each notch being adapted to engage the stem 48 of a previously mentioned rack 14. As shown in FIG. 8, the stem 48 of a rack is thin enough to slide laterally into a peripheral notch 46 and is equipped with a pair of short splines 50 dimensioned to fill the notch. The stem is further provided with a head 52 of greater cross-section than the peripheral notch to rest on the upper surface of the turntable to support the corresponding rack 14. It is apparent that with he stem 48 of a rack elevated somewhat with respect to the turntable 12 the stem may be slid sidewise ino a peripheral notch 46 and then the stem may be lowered to bring the two splines 50 into the notch for effective engagement of the stem with the turntable.

Each rack 14 may be of the construction shown in FIG. 8, the rack having two opposite side walls 54 and an intermediate wall 55, the three walls being rigidly interconnected by a plurality of rods 56. As shown in FIG. 8, the inner faces of the two side walls 54 and the opposite faces of the intermediate wall 55 are each provided with a series of four slots 58 that are open at their upper ends to receive and retain corresponding films 60. Preferably the slots 58 are staggered somewhat vertically, as may be seen in FIG. 8. Each rack holds eight films 60 and two of the racks will hold a complete set for dental X-ray film. It is to be noted that the stems 48 of the racks 14 cannot rotate in the peripheral notches 46, the notches cooperaing with the stem to hold all of the films 60 in radial alignment with respect to the turntable 12.

It is contemplated that the turntable 12 will be rotated step by step through eight steps to complete a cycle or full revoluion and that the turntable will carry as many as three racks 14 simultaneously to each of the eight stations. Accordingly, the periphery of the turntable 12 is divided into eight parts of 45° each and each of the eight parts is provided with three of the peripheral notches 46, as indicated in FIG. 1.

The first of the eight stations, which is designated 62 in FIG. 6, may be termed the loading station where racks of undeveloped film are loaded on the turntable 12 for processing. The second station is the middle fo the receptacle 32 that contains the developer solution. The third and fourth stations, designated 63 and 64 in FIG. 6, are at two spaced points in the second receptacle 34 that contains the fixing solution. The fifth and sixth stations, dsignated 65 and 66 in FIG. 6, are at spaced points in the third receptacle 35 in which the developed and fixed films are rinsed. The seventh station, designated 67 in FIG. 6, is a drip station where the films that are newly withdrawn from the rinse receptacle are permitted to drain onto the drip tray 45. The eighth station 68 may be termed the unloading station where the racks of completely processed film are disengaged from the turntable 12. It is to be noted, however, that the racks 14 of film may be loaded or unloaded at any one of the three stations 67, 68, and 62.

The turntable 12 is fixedly mounted on a vertical shaft 70 that is suitably mounted on the base 10 for both rotation and axial movement. For this purpose the shaft 70 may be embraced two spaced bearing collars 72 which are mounted in an upright tubular extension 74 of the circular step 30 in the top wall of the control chamber 22. The lower end of the vertical shaft 70 carries what may be termed a hub structure that includes a control disc, generally designated 75, the control disc having a hub portion 76 with a screw 78 anchoring the hub portion to the shaft 70. It is apparent that the control disc 75 may be rotated to rotate the turntable 12 and that the control disc may be elevated to elevate the turntable. Within the scope of invention any suitable mechanism may be employed in the control chamber 22 to cooperate with the control disc 75 for rotating and lifting the turntable 12.

In the present embodiment of the invention the components in the control chamber 22 include the following: a three-position selector switch 80 mounted on the control panel 28 and having an operating handle 82; a timer 84 also mounted on the control panel and having a knob 85 to adjust the frequency with which the timer closes a control circuit; a push button switch 86 which is also on the control panel; and elevator motor 88 having an associated gear box 90 for rotating a crank arm 92 that carries a crank, generally designated 94, the crank serving to lift and simultaneously rotate the control disc 75; a radial pin 95 (FIG. 2) carried by the crank 94 to rotate the control disc 75 one increment or 45° each time the crank raises and lowers the control disc; a switch 96 positioned for operaton by a cam 98 on the crank arm 92; an oscillation motor 100 having an associated gear box 102 for operating a downwardly extended crank 104; a tapered upright oscillation finger 105 eccentrically positioned on an oscillation plate 106 that is mounted on a pivot 108 and is connected by a connecting rod 110 to the previously mentioned downwardly extending crank 104; and a cycle switch 112 (FIGS. 3 and 5) having an operating member 114 in the form of an upwardly bent wire.

For cooperation with the radial pin 95 on the crank 94, the control disc 75 is formed with a circumferential series of eight equally spaced driving shoulders in the form of peripheral teeth 115, each of which is engaged by the pin for rotation of 45° of the turntable 12. When the elevator motor 88 is de-energized, the crank 94 is at its lowermost position with the control disc 75 resting thereon as shown in dotted lines in FIG. 2. Whenever the elevator motor 88 is energized by the timer 84, the first 180° of rotation of the crank 94 lifts the control disc 75 to the position shown in solid lines in FIG. 2 with consequent elevation of the turntable 12 from the dotted line position to the solid line position. During the second half of the revolution of the crank 94, the control disc and turntable are lowered to their normal positions and in the course of the upper half of the revolution of the crank 94 the radial pin 95 engages one of the teeth 115 to advance the rotation of the turntable.

For cooperation with the bent wire operating member 114 of the cycle switch 112, the control disc 75 is provided with a circumferential series of seven elongated apertures 116 spaced 45° apart to correspond to seven of the eight stations through which a rack of films is advanced by a complete cycle or revolution of the turntable 12. The eighth station which ends the cycle is represented by a blank space 118 on the control disc. At the first seven stations the normally closed cycle switch 112 is not operated because the bent wire operating member 114 registers with one of the elongated apertures 116 and is not affected by the lowering of the control disc by the crank 94, but when the control disc is lowered at the eighth station, the blank portion 118 of the control disc depresses the operating member 114 to open the cycle switch to stop the operation of the apparatus. The position of the blank portion 118 of the control disc 75 may correspond to any one of the drip, unload or load stations. To change the station at which the cycle ends, it is merely necessary to lift the control disc 75 by lifting the turntable 12 and then to rotate the control disc by means of the turntable to a new position.

For cooperation with the oscillation finger 105, the control disc 75 has a series of equally circumferentially spaced circular apertures 120. Each time the control disc 75 is lowered by the crank 94, one of the circular apertures 120 registers with the oscillation finger 105 for cooperation therewith. When the control disc 75 is in its lowermost position, the oscillation of the finger 105 causes corresponding oscillation of the control disc 75 and the turntable 12. As will be explained, one purpose of the switch 96 that is operated by the cam 98 is to control rotation of the crank 94 but, in this particular embodiment of the invention, the switch has the second function of de-energizing both the oscillation motor 100 and the timer 84 during each period of time in which the control disc 75 is raised and lowered by the crank.

The control system employed in the presently preferred practice of the invention is represented by the wiring diagram in FIG. 7. One lead 122 from the power source is connected to one side of the timer 84, one side of the oscillation motor 100 and one side of the elevator motor 88. The second lead 124 from the power source is connected to the switch arm of the selector switch 80 and is also connected to one side of the push button switch 86. The switch arm of the selector switch 80 is shown in its neutral or stop position for de-energizing the apparatus.

The left hand contact 125 of the selector switch 80, which contact is employed for continuous operation of the turntable 12, is connected by a wire 126 to one side of the normally closed cycle switch 112 and is also connected to the switch arm of the previously mentioned switch 96 that is operated by the cam 98. Normally the switch arm of the switch 96 rests against a contact 128 which is connected by a wire 130 to the second side of the oscillator motor 100 and is connected by a wire 132 to the second side of the timer 84. At its alternate position the switch arm of the switch 96 cooperates with a contact 134 which is connected by a wire 135 with the second side of the push button switch 86 and with the second side of the elevator motor 88.

A normally open switch 136 which is incorporated in the timer 84 is connected on one side to the wire 132 and is connected on the other side to the wire 135. The second side of the cycle switch 112 is connected by a wire 138 to the right hand contact 140 of the selector switch 80.

With the switch arm of the selector circuit against the contact 125 for continuous operation, both the timer 84 and the oscillation motor 100 are energized through switch 96. At predetermined time intervals the timer closes the switch 136 momentarily to energize the elevator motor and initial operation of the elevator motor mechanically changes the switch arm of the switch 96 from the contact 128 to the contact 134. One consequence of the change in the position of the switch arm is that the elevator motor continues to operate after the timer switch 136 opens, and another consequence is that both the timer and the oscillator motor are de-energized while the elevator motor is operating to raise and lower the turntable 12. As the crank 94 completes its revolution, it operates the switch 96 to de-energize the elevator motor and to restore energization of the timer and the oscillator motor. Thus, when the crank 94 is stationary at its lowermost position, the oscillator motor operates the oscillator finger 105 to oscillate the turntable for agitating the films that are immersed in the baths.

When the selector switch arm is at its alternate position against the right contact 140, the timer 84 operates in the described manner for periodic rotation of the crank 94 to periodically lift and rotate the turntable 12. When the turntable reaches the eighth station, however, the blank portion 118 of the control disc 75 drops onto the bent operating wire 114 of the switch 112 to terminate the cycle by de-energizing both the timer 84 and the oscillator motor 100. Thus the apparatus will cycle to process completely a set of films and then will stop automatically for an indefinite period so that the developed film may be removed at any convenient time. A new cycle may be initiated by the push button 86 which serves the same function as the timer switch 136 in initiating sufficient operation of the elevator motor 88 to cause the elevator motor to operate the switch 96.

By virtue of the described mode of operation, a set of films in a rack 14 follows a circular path concentric to the axis of rotation of the turntable and this path has a uniform series of eight undulations. The first undulation carries the set of film from the loading station 62 over the end wall 36 into the developer bath in the receptacle 32. While the film is immersed in the developer bath, the turntable oscillates for agitation of the film. The second undulation carries the film frmo the developer bath over the radial partition 42 into the fixer bath in the receptacle 34 where the immersed film is agitated. The next undulation lifts the film out of the bath in receptacle 34 momentarily and then returns the set of films to the same bath for another period of agitation. The next undulation carries the film over the partition 42 into the rinse bath in the receptacle 35 and the next undulation merely lifts the film momentarily from the rinse bath. After the film has been immersed a second time in the rinse bath and has been agitated therein, the next undulation carries the film over the end wall 38 into the drip station 67 where the film is free to drain onto the drip tray 45. The next undulation carries the film to the unloading station 68 and the final undulation carries the film back to the loading station 62.

Each time a rack of films is immersed in a bath the rack is reciprocated back and forth by the oscillation of the turntable. It is to be noted that the staggered disposition of the films in a rack encourages circulation of the bath between the films in response to the reciprocation of the rack.

FIGS. 9–12 show a second embodiment of a rack, generally designated 14a, that may be used. The rack 14a comprises two sheet metal channel members 150 and 152 which are nested together and are attached to a stiff wire hook 154, suitable rivets 155 being employed for this purpose. The channel member 150 has opposite longitudinal flanges 156 and the channel member 152 has corresponding opposite longitudinal flanges 158, the two sets of flanges cooperating to yieldingly and releasably engage films 60.

To facilitate mounting films 60 on the rack 14a, the channel member 150 is longer than the channel member 152 and the two flanges are bent at their upper and lower ends to form tongues 160 to facilitate insertion of films between the cooperating flanges. It is a simple matter to slide the end of a film 60 past a tongue 160 into wedging frictional engagement with a pair of cooperating flanges 156 and 158.

As shown in FIGS. 9 and 10, the rack 14a may be releasably mounted on a modified turntable 12a. The turntable 12a has peripheral notches 162 and corresponding apertures 164 so that the hook of the rack may hook into aperture 164 with the shank of the hook engaging the corresponding notch 162 as shown.

My description in specific detail will suggest various changes, substitutions and departures from my disclosure within the spirit and scope of the appended claims.

I claim:

1. In an apparatus for immersing articles in a succession of liquid baths, the combination of:
   a plurality of receptacles containing baths arranged sequentially along an arcuate path concentric to an upright axis;
   a carrier overhanging the arcuate path with the articles depending therefrom, said carrier having a hub structure on said axis, said hub structure having a circular series of shoulders;
   means to rotate the carrier on said axis to move the articles along the arcuate path; and means to raise the carrier to lift the articles to clear the walls of the receptacles and to lower the carrier to immerse the articles in the baths, said means to rotate, lift and lower the carrier comprising a power-actuated crank under the hub structure for intermittent operation to engage said circular series of shoulders in sequence.

2. A combination as set forth in claim 1 which includes means to oscillate the hub structure in the intervals between the operations of the crank to agitate the immersed articles.

3. In an apparatus for immersing articles in a succession of liquid baths, the combination of:

a turntable structure rotatable about an upright axis and movable along the axis, said structure having a series of driving shoulders;

means to support the articles on the turntable with the articles depending from the turntable;

a plurality of receptables arranged sequentially around the circumference of the turntable, said receptacles having walls confining baths; and a crank positioned under the structure to life the structure along said axis and simultaneously to engage one of said shoulders to rotate the structure by a given increment about the axis whereby the articles follow an undulating arcuate path for immersion of the articles in the baths in succession with the undulations causing the articles to clear said walls.

4. A combination as set forth in claim 3 which includes means to engage said structure to oscillate the structure to agitate the immersed articles.

5. A combination as set forth in claim 3 which includes:

a first motor to operate the crank;

a first normally open switch to close a circuit through the motor to initiate rotation of the crank;

a timer to close the switch periodically; and a second switch responsive to the crank to close a circuit through the motor when the crank is initially rotated and to open the circuit when the crank completes revolution.

6. A combination as set forth in claim 5 which includes:

means to oscillate said carrier to agitate the articles when the articles are immersed in the baths;

a second motor to actuate the oscillating means; and a third normally closed switch to complete a circuit through the second motor, said third switch being responsive to the crank to open when the crank operates.

7. A combination as set forth in claim 5 which includes a normally closed starter switch in parallel with said first switch.

8. A combination as set forth in claim 5 which includes a cycle-controlling switch responsive to rotation of the structure to de-energize said timer when the turntable structure completes one revolution.

9. A combination as set forth in claim 8 which includes a selector switch operable in one respect to energize the first motor through said cycle-controlling switch and operable in another respect for continuous operation of the motor independently of the cycle-controlling switch.

References Cited

UNITED STATES PATENTS

| | | | |
|---|---|---|---|
| 1,792,005 | 2/1931 | Elliott | 95—100 |
| 2,183,742 | 12/1939 | Hershberg | 95—14 |
| 2,723,610 | 11/1955 | Morrison | 95—89 |
| 2,872,894 | 2/1959 | Isreeli | 95—89 |

NORTON ANSHER, *Primary Examiner.*

FRED L. BRAUN, *Assistant Examiner.*